US008730948B2

(12) United States Patent
Le Rouzic et al.

(10) Patent No.: US 8,730,948 B2
(45) Date of Patent: May 20, 2014

(54) METHOD OF TERMINATING A CALL AND VOICE-OVER-IP TERMINAL

(75) Inventors: Jean-Claude Le Rouzic, Trebeurden (FR); Pierrick Peron, Lannion (FR)

(73) Assignee: France Telecom, Paris (FR)

( * ) Notice: Subject to any disclaimer, the term of this patent is extended or adjusted under 35 U.S.C. 154(b) by 190 days.

(21) Appl. No.: 12/935,276

(22) PCT Filed: Mar. 30, 2009

(86) PCT No.: PCT/FR2009/050531
§ 371 (c)(1),
(2), (4) Date: Sep. 28, 2010

(87) PCT Pub. No.: WO2009/125149
PCT Pub. Date: Oct. 15, 2009

(65) Prior Publication Data
US 2011/0019665 A1      Jan. 27, 2011

(30) Foreign Application Priority Data

Mar. 28, 2008 (FR) ..................................... 08 52046

(51) Int. Cl.
*H04L 12/66* (2006.01)

(52) U.S. Cl.
USPC ........................................................ 370/352

(58) Field of Classification Search
USPC ........... 370/352; 379/355, 210, 201; 455/445, 455/502, 500, 450, 436
See application file for complete search history.

(56) References Cited

U.S. PATENT DOCUMENTS

| 6,343,216 | B1 * | 1/2002 | Kim et al. ..................... 455/450 |
| 2002/0090947 | A1 * | 7/2002 | Brooks et al. ................. 455/436 |
| 2004/0032843 | A1 * | 2/2004 | Schaefer et al. .............. 370/338 |
| 2004/0157606 | A1 * | 8/2004 | Lee ............................ 455/435.1 |
| 2005/0255870 | A1 * | 11/2005 | Chang et al. .................. 455/502 |
| 2007/0274488 | A1 * | 11/2007 | Callaghan ................ 379/201.01 |
| 2007/0286165 | A1 * | 12/2007 | Chu et al. ...................... 370/352 |
| 2008/0118047 | A1 * | 5/2008 | Nachum .................. 379/210.01 |

FOREIGN PATENT DOCUMENTS

| CN | 1870826 A | 11/2006 |
| WO | WO 02/067533 | 8/2002 |
| WO | WO 2007/006644 A1 | 1/2007 |

OTHER PUBLICATIONS

M. Handley, "RFC 2543 SIP: Session Initiation Protocol", XP015008326, Mar. 1, 1999.
Office Action for Japanese Patent Application No. 2011-501281 mailed Oct. 1, 2013.
Office Action for Chinese Patent Application No. 2009801160151 mailed Feb. 16, 2013.

* cited by examiner

*Primary Examiner* — Chi Pham
*Assistant Examiner* — Fahmida Chowdhury
(74) *Attorney, Agent, or Firm* — Knobbe Martens Olson & Bear LLP (57) ABSTRACT

A method of terminating a call is used by a voice over IP terminal (3A, 3B) registered with an IP network core (2) and comprises a step of detecting the terminal (3A, 3B) hanging up during the call, a step of sending a device of the IP network core (2) a message to release the resources allocated to the call, and after the detection step, a step of waiting a predetermined time before sending the resource-release message. The resource-release message is sent at the end of the waiting step if the terminal (3A, 3B) being picked up is not detected during the predetermined time.

17 Claims, 3 Drawing Sheets

METHOD OF TERMINATING A CALL AND VOICE-OVER-IP TERMINAL

RELATED APPLICATIONS

This is a U.S. National Phase Application under 35 USC §371 of International Application PCT/FR2009/050531, filed on Mar. 30, 2009.

This application claims the priority of French application Ser. No. 08/520,476 filed on Mar. 28, 2008, the content of which is hereby incorporated by reference.

BACKGROUND OF THE INVENTION

The present invention relates to the general field of telecommunications and in particular to communication via the Internet.

It relates more particularly to mechanisms for terminating a voice over IP (Internet Protocol) call sent or received by a terminal such as a telephone implementing the Session Initiation Protocol (SIP), for example. Such a terminal is also known as a voice over IP terminal or VoIP terminal.

In the current state of the art, when a voice over IP terminal hangs up, the resources allocated to the call at the terminal level and more generally in the network are released immediately and the call between the two parties is terminated definitively.

Consequently, if hanging up is linked to misoperation of the VoIP terminal, for example accidentally pressing the hang-up key of the terminal or accidentally dropping the handset of the terminal onto its base after picking it up, to resume the conversation the user of the VoIP terminal has no solution other than to call the other party again.

In standard time-division switching in public switched telephone networks (PSTN) there is a hang-up/repick-up mechanism that enables a called subscriber to hang up their telephone handset and then to pick up the same handset or another handset within some determined time interval without the call with the other party being cut off. The use of such a mechanism in a PSTN relies on call suspension messages exchanged between the subscriber connection unit and the autoswitch to which it is connected.

Because of the architecture and the design of voice over IP networks, voice over IP protocols do not include such exchanges. Consequently, any misoperation of a voice over IP terminal handset during a call inevitably leads at present to the resources associated with the call being released.

OBJECT AND SUMMARY OF THE INVENTION

A first aspect of the present invention provides a method of terminating a call, used by a voice over IP terminal registered with an IP network core, said method comprising:
- a step of detecting the terminal hanging up during the call; and
- a step of sending a device of the IP network core a message to release the resources allocated to the call.

According to an embodiment of the invention, the termination method further comprises, after the detection step, a waiting step of waiting a predetermined time before sending the resource-release message, and the resource-release message is sent at the end of the waiting step if the terminal being picked up has not been detected during the predetermined time.

For simplification and clarity, the predetermined time of the method of the invention is referred to as the "time-delay" below.

Thus the invention proposes a simple mechanism implemented in a calling or called VoIP terminal for resuming a call interrupted momentarily, for example because of accidentally hanging up the terminal, without having to allocate new resources to the call.

The invention delays sending the message to release the resources allocated to the call for a predetermined time. One such a message is for example a message using the BYE method in SIP.

The sending and the receiving of the resource-release message by the terminal and by the IP network core, respectively, usually terminate the call, the network and the terminals involved in the call then releasing the resources allocated to the call. The invention has the advantage that, because this resource-release message is not sent during the time delay, all resources allocated for the call are retained after hanging up. In this way, in response to picking up the terminal during the time delay (to be more precise to picking up the terminal again), the call may resume in a manner that is transparent for the network and the users participating in the call.

Moreover, as explained above, the termination method of the invention is implemented in the terminal and advantageously uses the capacities of a VoIP terminal, in particular management by the VoIP terminal (for example by a SIP user agent of the terminal) of its own status (detection of hanging up, picking up, etc.). Thus the invention requires only the implementation of an internal timer in the VoIP terminal to defer sending the resource-release message. It is therefore not necessary to use exchanges of signaling messages other than those already used between the VoIP terminal and the IP network core during a call.

The present invention also has the advantage that it does not require the use of complex methods between the terminal and the network core, such as the SIP SUBSCRIBE and NOTIFY messages, for example, which are particularly greedy in terms of resources and often make managing voice over IP networks difficult and problematic.

In one particular implementation of the invention, the predetermined time (i.e. time delay) used in the termination method is fixed in a message received by the VoIP terminal from a device of the IP network core.

It is therefore possible for the voice over IP network core to fix the time delay applied by the terminal before sending the resource-release message after hanging up. Thus the network operator is able to fix a similar time delay for all terminals registered with it to render uniform the services associated with the various terminals.

Alternatively, and in contrast, the operator of the network may adapt the time delay as a function of the type of terminal. For example, it may advantageously send a terminal a longer than average time delay if the terminal is considered as particularly susceptible to accidental hanging up, and vice-versa.

For example, when terminal is a called terminal for the purposes of the call, the received message fixing the predetermined time delay may be an initiation message of the call.

Alternatively, when the terminal is a calling terminal for the purposes of the call, the received message fixing the predetermined time delay may be a message notifying a call in progress or a message notifying that a called terminal for the purposes of the call has been picked up.

As a further alternative, the received message fixing the predetermined time delay may be a response message to a request to register the terminal with the network core.

The time delay may in particular be included in a header of one of these messages. Thus it is not necessary to create new messages (i.e. to create new SIP methods) to inform the terminal of the time delay to be applied in the context of the termination method of the invention, which is highly advantageous.

In another implementation of the invention, the predetermined time can be configured in the terminal.

As a result, the terminal user may modify the time delay to be applied by the method of the invention as a function of his/her requirements and expectations. This may in particular be effected by providing an appropriate menu in the terminal, accessed via the keypad of the terminal, for example.

In another implementation of the invention, the predetermined time is predefined in the terminal. For example, it may be predefined by the manufacturer of the terminal and stored in non-volatile non-rewritable memory or read-only memory of the VoIP terminal.

Another aspect of the invention is directed to a voice over IP terminal registered with an IP network core, including:
   means for detecting the terminal hanging up during a call; and
   means for sending a device of the IP network core a message to release the resources allocated to the call.

According to an embodiment of the invention, the voice over IP terminal further includes:
   means for delaying the sending of the resource-release message for a predetermined time following detection of hanging up by the detection means; and
   means for detecting the terminal picking up; and is noteworthy in that the means for sending the resource-release message are adapted to send the resource-release message to the device of the network core after the predetermined time if the terminal being picked up is not detected during the predetermined time by the means for detecting picking up.

In one particular embodiment, said voice over IP terminal comprises analog telephone equipment connected to a voice over IP protocol adaptor/converter.

In one particular embodiment, the steps of the method of the invention of terminating a call are determined by computer program instructions.

Another aspect of the invention provides a computer program on a data medium, the program being usable in a voice over IP terminal of the invention, or more generally in a computer, and including instructions adapted to implement the steps of a method of terminating a call as described above.

The program may use any programming language, and take the form of source code, object code, or a code intermediate between source code and object code, such as a partially-compiled form, or any other suitable form.

Another aspect of the invention provides a computer-readable data medium containing instructions of the above computer program.

The data medium may be any entity or device capable of storing the program. For example, the medium may include storage means, such as a ROM, for example a CD ROM or a micro-electronic circuit ROM, or magnetic storage means, for example a floppy disk or a hard disk.

The data medium may be a transmissible medium such as an electrical or optical signal, which may be routed via an electrical or optical cable, by radio, or by other means. The program of the invention may in particular be downloaded over an Internet-type network.

Alternatively, the data medium may be an integrated circuit in which the program is incorporated, the circuit being adapted to execute the method in question or to be used in its execution.

A further aspect of the invention provides a communications system including a voice over IP terminal as described above, and:
   means for receiving from the terminal a message including an indication that the terminal is adapted to wait a predetermined time before sending a message to release the resources linked to a call following detection of the terminal hanging up during the call and sending the resource-release message after the predetermined time if picking up has not been detected during the predetermined time;
   means for obtaining said predetermined time; and
   means for sending this predetermined time to the terminal in a message; these means being distributed in one or more devices of an IP communications network core of the system.

A further aspect of the invention provides a signal containing a message and sent by a voice over IP terminal to a device of a core of an IP communications network, which signal is noteworthy in that the message includes a header including an indication that the terminal is adapted to wait a predetermined time before sending a message to release the resources linked to a call following detection of the terminal hanging up during the call and sending the resource-release message at the end of said predetermined time if picking up has not been detected during the predetermined time.

In one particular embodiment, the signal further includes another header including a value for this predetermined time.

BRIEF DESCRIPTION OF THE DRAWINGS

Other features and advantages of the present invention emerge from the following description given with reference to the drawings and the appendix, which relate to a non-limiting embodiment of the invention and in which.

DETAILED DESCRIPTION OF EMBODIMENTS OF THE INVENTION

Figure 1:
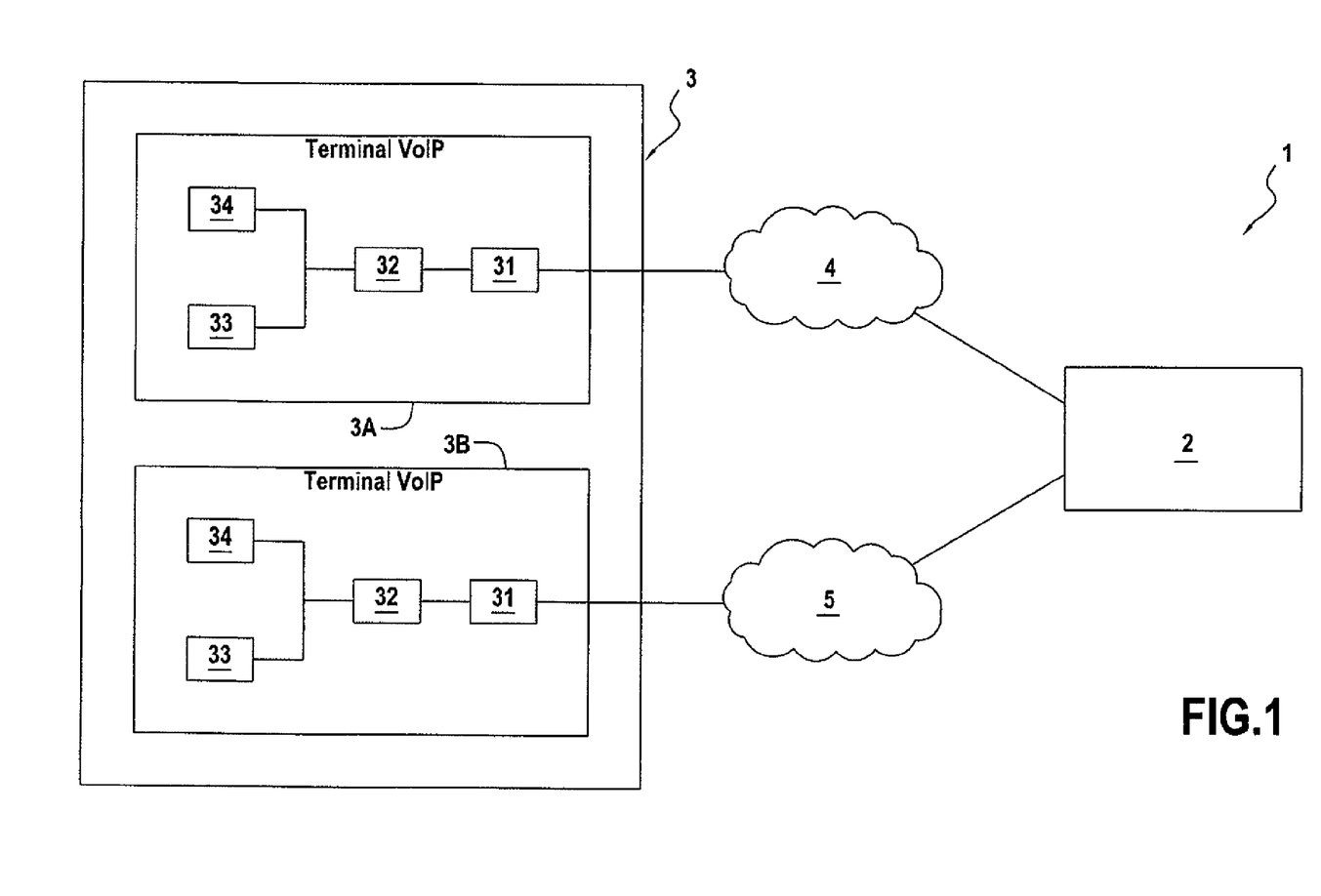
FIG. 1 shows a voice over IP terminal of one particular embodiment of the invention in its environment.

FIG. 1 represents a voice over IP communications network 1.

In the example considered here, the communications network 1 is based on an IMS (IP Multimedia Subsystem) architecture, as specified in 3GPP and TISPAN standards in particular. As is known in the art, such a network offers voice over IP services based on the Session Initiation Protocol (SIP). The invention may of course be applied to other types of architecture supporting voice over IP, for example a software switch architecture (commonly referred to as a "soft-switch" architecture) or a "proxy registrar" architecture.

The communications network 1 comprises an IMS network core 2 and a plurality of terminals 3 (for example terminals 3A and 3B) able to connect to the IMS network 1 after registering with it via various access networks.

The two terminals 3A and 3B considered here are voice over IP terminals of the invention, for example voice over IP telephones using the Session Initiation Protocol. Alternatively, other terminals may be envisaged: for example a laptop computer provided with a microphone and loudspeakers or analog telephone equipment connected to a voice over IP protocol adaptor/converter such as a home gateway or an SIP gateway ("SIP DSLAM") as defined in the ETSI technical specification TS 183043. As is known in the art, the voice over IP terminals 3A and 3B are adapted to communicate using the Session Initiation Protocol with the network core 2 and each of them incorporates an SIP call processing automaton (user agent), not shown in FIG. 1, able to detect the status of the terminal.

The terminals 3A and 35 have the hardware architecture of a computer and in particular include means 31 for communicating via an access network (access network 4 and access network 5, respectively), a processor 32, a random-access memory 33, and a read-only memory 34, together with a clock (not shown in the figure) for timing operations and measuring a predetermined time.

Figure 2:
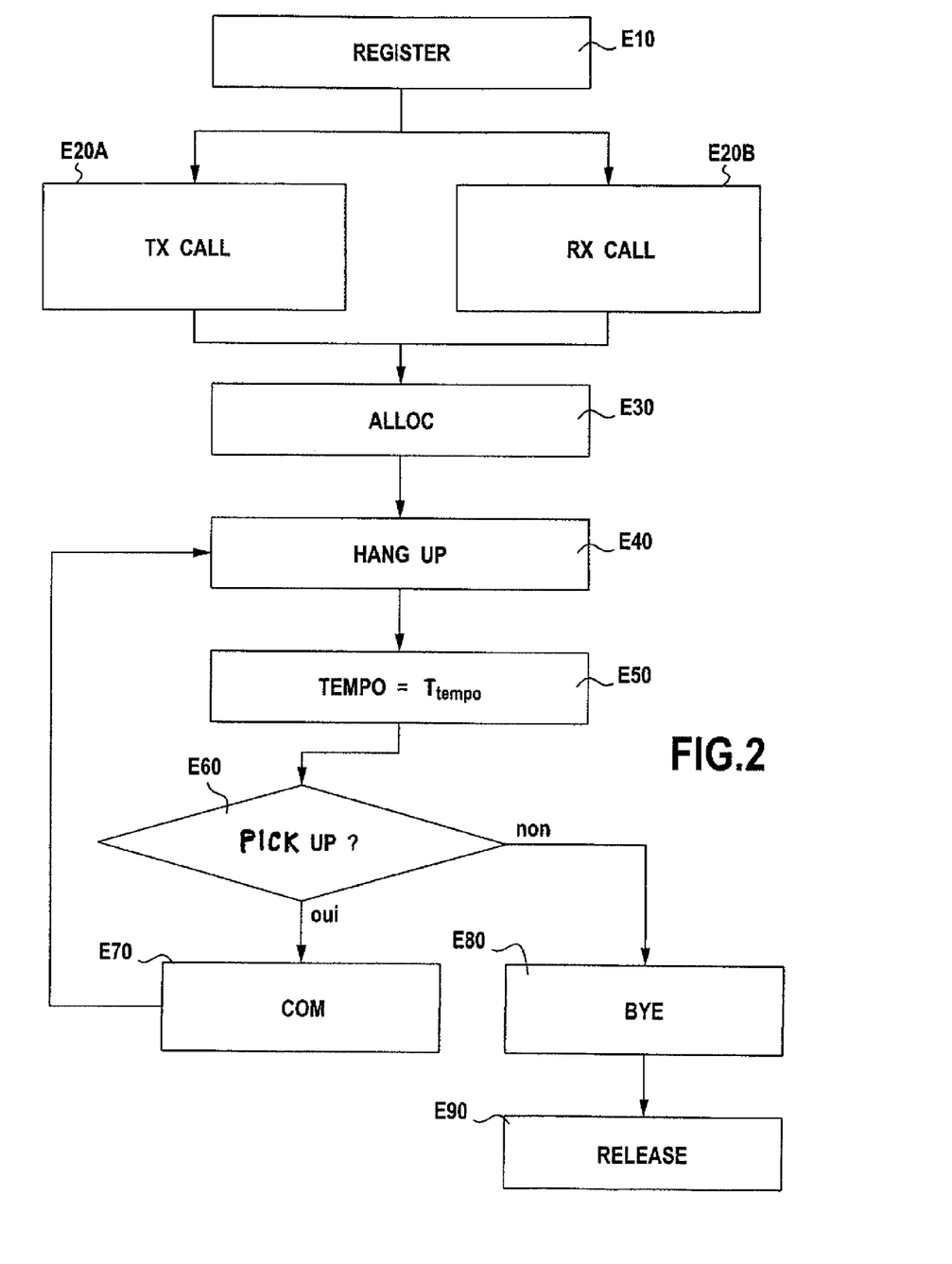
FIG. 2 is a flowchart showing the main steps of the termination method of the invention when used in a voice over IP terminal as shown in FIG. 1.

The read-only memory 34 of the terminal 3A, respectively the terminal 3B, described here includes a computer program adapted to execute the main steps of the method of the invention of terminating a call represented in FIG. 2 and as described below. Also stored in the memory 34 of the terminal 3A, respectively the terminal 3B, is a default time delay $T_{def}$ predefined in the terminal 3A, respectively the terminal 3B. In the example described here, the default time delay is the same for both the terminals 3A and 3B, for example $T_{def}$=10 s.

The respective access networks 4 and 5 of the terminals 3A and 3B envisaged here are ADSL (Asymmetric Digital Subscriber Line) networks. Alternatively, other access networks may be considered for connecting the VoIP terminal 3A and/or 3B to the IMS network 1, such as in particular a UMTS (Universal Mobile Telecommunications System) network, a WLAN (Wireless Local Area Network) or a WiFi (Wireless Fidelity) network.

Moreover, the invention applies with equal advantage if only one of the terminals 3A and 3B is a voice over IP terminal of the invention, the other terminal being connected to an analog PSTN access network, for example.

As is known in the art, the IMS network core 2 comprises various functional entities (not represented in FIG. 1), including a CSCF (Call Session Control Function) entity, an MRFC (Multimedia Resource Function Controller) entity, a BGCF (Breakout Gateway Control Function) entity, and a MGCF (Media Gateway Controller Function) entity. These entities are described in more detail in the TISPAN document "ES 282 007 IP Multimedia Subsystem (IMS): Functional architecture NGN IMS Architecture", ETSI, Technical Report, 2006, for example.

The CSCF entity is responsible for setting up, monitoring and clearing down multimedia sessions in the IMS network 1 and thus voice over IP sessions in particular. It manages in particular interaction with user terminals. As is known in the art, the CSCF entity comprises:

a Proxy-CSCF (P-CSCF), which is (generally) the entry point of the terminal to the IMS communications network 1;

a Serving-CSCF (S-CSCF), a central signaling node in the IMS network that in particular manages registration of terminals with the IMS network; and     an Interrogating-CSCF (I-CSCF) adapted to manage connections between terminals in the IMS network.

A call between two terminals of the IMS network 1 passes through the P-CSCF, S-CSCF and I-CSCF functional entities.

In the embodiments described here, the S-CSCF entity of the network core 2 includes a memory storing a time delay $T_{delay}$ that is fixed homogeneously for all the terminals of the IMS network 1 implementing the termination method of the invention. Alternatively, this time delay may vary as a function of the terminals in the IMS network 1.

For simplicity, it is considered here that the terminals 3A and 3B use the same P-CSCF server and the same S-CSCF server. The invention is of course easy to transpose to situations where the terminals 3A and 3B are associated with different P-CSCF and S-CSCF servers.

The main steps of the method of the invention of terminating a call when implemented by a (called or calling) terminal of the invention in the IMS communications network 1 are described below with reference to FIG. 2.

To this end, without this being limiting on the invention, a call from the calling terminal 3A to the calling terminal 3B is considered. As described above, the invention applies equally to a calling and/or a called terminal, a terminal being a calling terminal some of the time and a called terminal some of the time, of course.

As is known in the art, to be able to communicate over the IMS network 1 the VoIP terminal must be registered with the IMS network core 2.

To this end, the terminal 3A sends the network core 2 an SIP registration request REGISTER (step E10). As is known to the person skilled in the art, the P-CSCF server receives this request and sends it to the S-CSCF server via the I-CSCF.

On reception of this message, the S-CSCF server of the network core 2 stores the registration of the terminal 3A and assigns the terminal 3A a registration time (for example 1 hour). It sends this registration time to the terminal 3A in response to the request message.

The terminal 3B registers with the network core 2 in a similar way.

Assume now that the user of the terminal 3A picks up the handset to call the terminal 3B. This is detected by the SIP user agent of the terminal 3A. The terminal 3A then sends an SIP call initiation message INVITE to the network core 2 to set up a call with the terminal 3B (step E20A).

This call initiation message passes through the P-CSCF server of the network core 2 to the S-CSCF server, where it is processed. The S-CSCF server sends the called terminal 3B the call initiation message, where appropriate after invoking application servers.

Assume that, on reception of this call initiation message, the user of the terminal 3B picks up their terminal in order to set up the call with the terminal 3A (step E20B). This is detected by the SIP user agent of the terminal 3B and signaled to the S-CSCF server of the network core 2, which in turn informs the terminal 3A.

In response to the terminal 3B picking up, resources for the call are allocated in a manner known in the art in the network core 2 and in the VoIP terminals 3A and 3B (step E30). Such resources are, for example, at the level of the network core 2, linked to signaling (e.g. reserving contexts in each node of a network through which the call passes) and to media streams (e.g. authorization for media streams associated with the call to pass through). In each VoIP terminal, the resources allocated include resources linked to reproducing the media streams and resources linked to processing call signaling the SIP user agent of the terminal.

It is now envisaged that the terminal 3B is hung up by its user during the call set up in this way. In a manner known in the art, this is detected immediately by the call processing SIP user agent of the terminal 3B (step E40).

On detection of hanging up, an internal timer of the terminal 3B is set for a predetermined time equal to a time delay $T_{delay}$ (step E50), for example using the clock of the terminal 3B. On setting this timer, the sending of the resource-release message conventionally sent by the SIP user agent of a voice over IP terminal after detecting hanging up (SIP message BYE) is deferred for a period equal to the time delay $T_{delay}$.

This time delay $T_{delay}$ is advantageously configured in the terminal 3B during a preliminary step. To this end, various configuration options may be implemented.

For example, the time delay $T_{delay}$ applied in the termination method of the invention may be fixed by a device of the voice over IP network core 2 (for example the S-CSCF server) and sent to the terminal in an appropriate message. Two implementations implementing this configuration option are described in more detail below with reference to FIGS. 3 and 4.

This hypothesis is in no way limiting on the invention, however, as other options for configuring the time delay may be used. In particular, the delay $T_{delay}$ may be predefined in the VoIP terminal, for example hard-coded in a non-volatile non-rewritable memory of the terminal. The delay hard-coded in this way may in particular be equal to the standard delay applied at present in standard time-division switching networks (e.g. 4 seconds in the Orange network in France).

Alternatively, the time $T_{delay}$ may be configured in the VoIP terminal, for example by the terminal user consulting an appropriate menu via a web interface and the keypad of the terminal or any other interface between the user and the terminal.

A further implementation implements simultaneously in the VoIP terminal the above three options for configuring the delay $T_{delay}$, namely:
  delay fixed by the network and received in a message sent by the network core 2 (option 1);
  delay predefined in the terminal (option 2); and
  delay configured in the terminal (option 3).
In this situation, a relative priority order for these options is preferably implemented to select the delay $T_{delay}$ to be applied in the terminal, for example in the order option 1, option 3 then option 2.

Thus, according to the invention, during the delay step E50, the resources allocated to the call by the network core 2 and the terminals 3A and 3B are retained, sending of the SIP resource-release message (BYE) by the terminal 3B being delayed. In particular, the resources allocated for the call in the terminal 3B are retained, such as the resources for reproduction of media streams by the terminal 3B and resources linked to processing of call signaling by the call processing SIP user agent of the terminal 3B. In other words, during the delay step E50, the terminal 3B goes to a state of waiting to detect picking up (step E60) or expiry of the time delay.

If the SIP user agent of the terminal 3B detects the terminal 3B picking up (i.e. picking up again) before the time delay $T_{delay}$ expires, the call with the terminal 3A resumes in a manner that is transparent for the network core 2 and the users of the terminals 3A and 3B (step E70). The timer is disarmed and at this point sending of the resource-release message BYE is cancelled.

If not, for example following intentional hanging up of the terminal 3B at the end of the call, i.e. if the time delay expires and the SIP user agent of the terminal 3B has not detected the terminal 3B picking up (i.e. picking up again), a resource-release message using the SIP message BYE is sent by the terminal 3B to the network core 2 (step E80) and the resources allocated by the terminal 3B are released (step E90).

On reception of the resource-release message BYE, the network core 2 releases the resources in the network allocated to the call and forwards the message to the terminal 3A. On reception of this message, the resources allocated to the call by the terminal 3A are immediately released. Moreover, if a timer has been set in accordance with the invention, this timer is also disarmed following the terminal 3A hanging up (for example in a manner that is slightly offset—i.e. delayed—relative to the terminal 3B hanging up).

In another embodiment, the terminals 3A and/or 3B further include an "immediate hang-up" button which, when activated, causes immediate sending of the resource-release message BYE without waiting for the time delay to expire. This button may in particular be active only for outgoing calls (for example a blinking LED in the button could indicate to the calling terminal user activation of the function associated with the "immediate hang-up" button), enabling the calling user to release immediately a call that they have initiated, for example to avoid being billed for the time delay.

Figure 3:
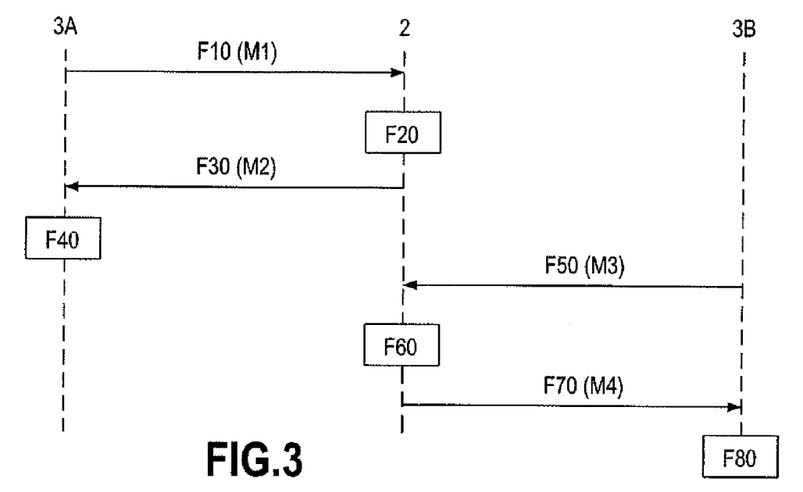
FIG. 3 is a diagram showing the main steps executed in a first implementation of the invention to act, under the control of the IP network core, to configure the time delay applied by the voice over IP terminal when using the termination method.
Figure 4:
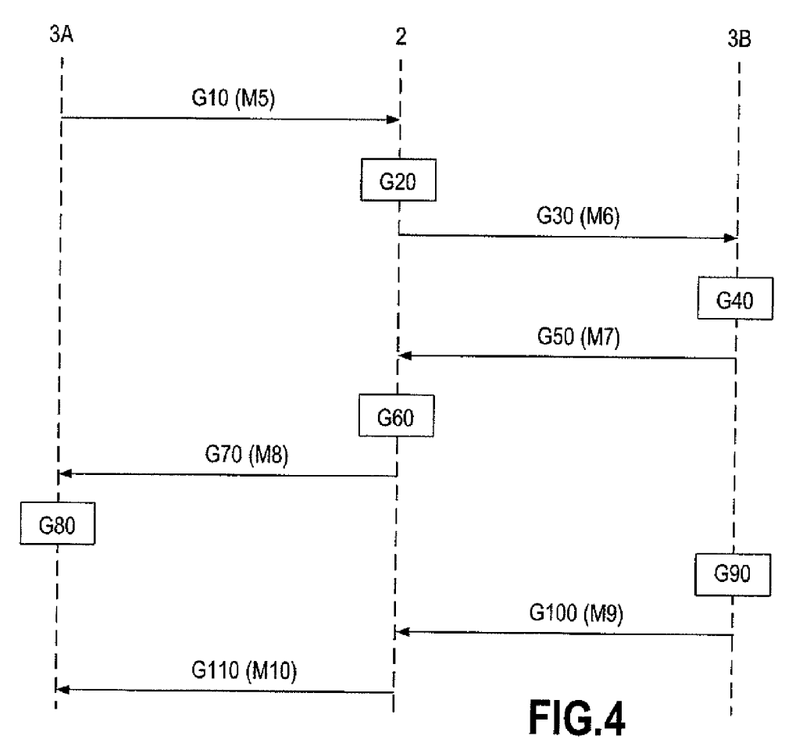
FIG. 4 is a diagram showing the main steps executed in a second implementation of the invention to act, under the control of the IP network core, to configure the time delay applied by the voice over IP terminal when using the termination method; and the appendix provides an example of a message that may be included in a signal of the invention and an example of a message enabling a network core device to fix the time delay in an implementation of the invention using the SIP protocol.

Two implementations are described below with reference to FIGS. 3 and 4 that aim, under the control of the IMS network core 2, to configure the time delay $T_{delay}$ used by a voice over IP terminal (for example by the terminal 3A or the terminal 3B) when using the termination method of the invention.

In the first implementation described with reference to FIG. 3, the time delay $T_{delay}$ is configured in the terminal under the control of the network core 2 when registering this terminal with the IMS network 1.

In order to be registered with the network, as described above, the VoIP terminal 3A sends the network core 2 a message M1 requesting registration using the SIP message REGISTER (step F10). This message is transported over the network in a signal conforming to the invention.

The SIP message REGISTER M1 includes various headers, in particular a header "Supported" that indicates the services supported by the terminal 3A in a general manner, using specific identifiers also known as option tags predefined by the IANA (Internet Assigned Number Authority). A description of the headers and the option tags already defined by the IANA that may be included in the SIP messages exchanged may be found in the IETF document "RFC 3261-SIP: Session Initiation Protocol".

In the first implementation described here, the Supported header of the message M1 includes an option tag, for example rd, appropriately defined by the IANA beforehand and informing the network core 2 that the terminal 3A implements (i.e. supports) a call termination method of the invention.

Here the message M1 also carries the default time delay $T_{delay}$ predefined in the terminal 3A, for example in another message header Racdec appropriately defined beforehand by the IANA.

The appendix gives an example of the content of the message M1.

On reception of the message M1 by the S-CSCF server of the network core 2, the headers of the message M1 are read and analyzed. This analysis enables the server to detect that the terminal 3A supports the call termination method of the invention by reading the Supported header and the option tag rd (step F20). Following this, the S-CSCF server of the network core 2 stores this information and consults its memory to obtain the time delay $T_{delay}$ to send to the terminal 3A.

Alternatively, an application server of the IMS network may analyze the message M1 to obtain the time delay.

The S-CSCF server then sends in response to the message M1 a 200 OK message M2 (step F30) including:
- a Require header in which it places the option tag rd to confirm to the terminal 3A that it has detected that it supports the termination method of the invention; and
- a Racdec header in which it places the time delay $T_{delay}$ imposed by the network core 2 and that the terminal 3A must apply when using the call termination method of the invention.

This response message M2 also incorporates, as described above, the time for which the terminal 3A is considered to be registered with the network core 2 (1 hour here, for example, i.e. 3600 s). As is known in the art, this time is contained in the "expires" parameter of the "Contact" header of the response message M2.

The appendix gives an example of the content of the message M2.

On reception of the message M2, the terminal 3A extracts the time delay $T_{delay}$ in the Racdec header and stores it, for example in its random-access memory 33 (step F40).

In a similar way, the terminal 3B is registered with the network core 2 by sending an SIP REGISTER message M3 transported in the network by a signal conforming to the invention and including in the Supported header the option tag rd indicating to the network core 2 that it supports the core termination method of the invention and a Racdec header containing the default value $T_{def}$ predefined in the terminal 3B (step F50).

The following steps are similar to the respective steps F20, F30, and F40 described above for the terminal 3A:
- the S-CSCF server of the network core 2 analyzing the registration message M3 (step F60);
- sending a response message M4 to the message M3 of the terminal 3B (step F70) including the time delay $T_{delay}$ imposed by the network core 2 that the terminal 3B must apply when using the call termination method of the invention; and
- the terminal 3B extracting and storing the value $T_{delay}$ (step F80).

Thus after the steps F40 and F80 the terminals 3A and 3B know the time delay $T_{delay}$ to be applied when using the call termination method of the invention, i.e. the predetermined time that they must wait before sending a message to release the resources allocated to a call following detection of hanging up during the call.

In the first implementation described here, the network core sends the time delay $T_{delay}$ to the voice over IP terminals implementing the method of the invention when the terminals are registered with the network core. The registration of a voice over IP terminal with a network core is generally temporary (for 1 hour here, for example). Thus the time delay $T_{delay}$ may be sent by the network core and stored in the voice over IP terminal each time its registration is refreshed.

Configuring the time delay $T_{delay}$ in the VoIP terminals under the control of the network core 2 in a second implementation is described below with reference to FIG. 4. In this second implementation, the time delay $T_{delay}$ is sent by the network core 2:
- in the call initiation message sent to the called terminal 3B; and
- in the call in progress or picking up message sent to the calling terminal 3A.

It is assumed here that the terminal 3A sends the network core 2 a call initiation message M5 to set up a call with the terminal 3B using the SIP message INVITE (step G10). This message M5 is transported over the network in a signal conforming to the invention.

In the second implementation described here the INVITE message M5 includes a Supported header in which the terminal 3A has advantageously placed the option tag rd to indicate to the network core 2 that it supports a call termination method of the invention, in a similar way to the SIP message REGISTER in the first implementation.

Moreover, the message M5 also contains the default time delay $T_{delay}$ predefined in the terminal, for example in a Racdec header appropriately defined beforehand by the IANA.

On reception of the message M5, its headers are read and analyzed by the S-CSCF server of the network core 2. The S-CSCF server then stores the information that the terminal 3A supports the termination method of the invention (step G20) in order to send it the time delay to be applied when using the method subsequently, in response to the call message M5.

The S-CSCF server then transfers the call initiation message INVITE M5 to the called terminal 3B (step G30) in the form of a call initiation message INVITE M6. In this message M6 is further specified the time delay $T_{delay}$ that the terminal 3B must apply during the termination method of the invention if the terminal 3B supports that method. At this stage, the S-CSCF server of the network core 2 does not know if the terminal 3B supports the method of the invention. The time delay $T_{delay}$ was obtained after interrogating the memory of the S-CSCF server. Alternatively, it may be obtained by interrogating an application server of the IMS network 1.

The time delay $T_{delay}$ is sent in the Racdec header of the message M6, replacing the time $T_{def}$ sent by the terminal 3A in the message M5. Alternatively, it may be placed in another entity of the message M6 appropriately defined previously by the IANA.

On reception of the message M6, the terminal 3B extracts the time delay $T_{delay}$ and stores it, for example in its random-access memory 33 (step G40), in order to use it during the termination method of the invention (instead of the predefined default time $T_{def}$ in the memory 34 of the terminal 3B).

It then sends the S-SCSF server of the network core 2 via the P-CSCF server a 180 RINGING response message M7 to the message M6 confirming that the call is in progress, which message is perceived by the user of the terminal, for example in the form of ringing tone (step G50). This message M7 is transported over the network in a signal conforming to the invention. Here the response message M7 contains the option tag rd in the Require header, thus indicating to the network core 2 that it supports the call termination method of the invention and that it will be used on hanging up. Further, the terminal 3B indicates in the response message M7, for example in the header Racdec of the message, the time delay that will be applied by the terminal 3B during the termination method of the invention, namely here the time $T_{delay}$ sent by the network core 2.

On reception of the message M7, the S-CSCF server fixes the time delay to be sent to the calling terminal 3A (step G60) by consulting its memory. In the example described here, this time delay is the time delay $T_{delay}$ previously obtained for the terminal 3B. Thus a homogeneous time delay is fixed for each voice over IP terminal in the IMS network 1, which is advantageous. Alternatively, a different time delay may be obtained for the terminals 3A and 3B.

This time delay $T_{delay}$ is sent to the terminal 3A in a 180 RINGING message M8 in the Racdec header of this message (step G70). The option tag rd specifying that the termination method of the invention must be used by the terminal 3A on hanging up is sent to it in the Require header. The message M8 informs the terminal 3A that the call to the terminal 3B is in progress, which message is perceived by the user of the terminal 3A, for example in the form of ringing tone.

On reception of the message M8, the terminal 3A extracts time delay $T_{delay}$ and stores it, for example in its random-access memory 33 (step G80), in order to use it during the termination method of the invention instead of the predefined default time $T_{def}$ stored in the memory 34 of the terminal 3A.

It is assumed now that the user of the terminal 3B picks up the terminal following the call from the terminal 3A (step G90). This is detected in a manner known to the person skilled in the art by the SIP user agent of the terminal 3B and as the consequence dedicated resources are allocated to this call in the terminal 3B.

The terminal 3B then signals picking up to the network core 2 in a pick-up notification (200 OK) message M9 (step G100). The pick-up message M9 includes in the Racdec header the time delay $T_{delay}$ applied by the terminal 3B.

The message M9 is transferred in the form of a pick-up notification (200 OK) message M10 by the network core 2 to the terminal 3A after allocation of the resources dedicated to the call by the network core 2 (step G110). The message M10 includes in the Racdec header the time delay $T_{delay}$ that the terminal 3A must apply.

On reception of the message M10, the terminal 3A allocates the resources necessary for the call.

In both implementations described here, the information contained in the SIP messages M1 and M5, respectively M3 and M7, conveyed by the signals of the invention to the effect that the terminal 3A, respectively the terminal 3B, supports the termination method of the invention is contained in a Supported header or a Require header. These hypotheses are in no way limiting on the invention.

Alternatively, this indication may be in another header of the message conveyed by the signal of the invention. For example, the message itself may contain this indication in the Racdec header. In particular, the presence or absence of this header in the message sent by the terminal in itself constitutes an indication that the terminal supports the termination method of the invention. Moreover, additional parameters in the Racdec header could be introduced, for example to specify if the network wishes to implement the mechanism or not.

APPENDIX

| Message M1 SIP Message: REGISTER | | |
|---|---|---|
| Headers | Supported | rd, etc. |
| | Racdec | $T_{def}$ |
| | ... | |
| | ... | |
| | Message body | |

| Message M2 Response code: 200 OK | | |
|---|---|---|
| Headers | Require | rd, etc. |
| | Racdec | $T_{delay}$ |
| | Contact | expires = 3600 |
| | ... | |
| | ... | |
| | Message body | |

The invention claimed is:

1. A method of terminating a call, used by a voice over IP terminal registered with an IP network core, said method comprising:
    detecting the pressing of a hang-up key during said call;
    sending by said terminal to a device of said IP network core a message to release resources allocated to said call; and
    after said detection of said pressing of said hang-up key, waiting a predetermined time before sending said resource-release message, wherein said resource-release message is sent at the end of said waiting for said predetermined time if said terminal being picked up by a user is not detected during said predetermined time.

2. The termination method according to claim 1, wherein said predetermined time is fixed in a message received by said terminal from a device of said IP network core.

3. The termination method according to claim 2, wherein said terminal is a called terminal for the purposes of said call, and wherein said received message fixing said predetermined time is an initiation message of said call.

4. The termination method according to claim 2, wherein said terminal is a calling terminal for the purposes of said call, and wherein said received message fixing said predetermined time is a message notifying a call in progress or a message notifying that a called terminal for the purposes of said call has been picked up.

5. The termination method according to claim 2, wherein said received message fixing said predetermined time is a response message to a step of registering said terminal with said network core.

6. The termination method according to claim 2, wherein said predetermined time is contained in a header of said received message.

7. The termination method according to claim 1, wherein said predetermined time is configurable in said terminal.

8. The termination method according to claim 1, wherein said predetermined time is predefined in said terminal.

9. A computer program including instructions for executing the steps of the termination method according to claim 1 when said program is executed by a computer computing system comprising:
    a processor;
    a memory; and
    executable instructions residing on said memory which, when executed, cause a voice over IP terminal registered with an IP network core to:
    detect that a hang-up key has been pressed during said call;
        send a device of said IP network core a message to release resources allocated to said call; and
        after said detection of said pressing of said hang-up key, to wait a predetermined time before sending said resource-release message, wherein said resource-release message is sent at the end of said waiting for said predetermined time if said terminal being picked up by a user is not detected during said predetermined time.

10. A non-transitory computer-readable storage medium storing instructions which when executed by a processor cause a voice over IP terminal registered with an IP network core to:
    detect that a hang-up key has been pressed during said call;
    send a device of said IP network core a message to release resources allocated to said call; and
    after said detection of said pressing of said hang-up key, to wait a predetermined time before sending said resource-release message, wherein said resource-release message is sent at the end of said waiting for said predetermined time if said terminal being picked up by a user is not detected during said predetermined time.

11. A voice over IP terminal registered with an IP network core, comprising:
   means for detecting the pressing of a hang-up key on the IP terminal during a call;
   sending means for sending a device of said IP network core a message to release resources allocated to said call;
   means for delaying said sending for a predetermined time following detection of said pressing of said hang-up key; and
   means for detecting said terminal picking up;
   said sending means being adapted to send said resource-release message to said device of the network core after the predetermined time if picking up by a user has not been detected by said means for detecting picking up during said predetermined time.

12. The voice over IP terminal according to claim 11, comprising analog telephone equipment connected to a voice over IP protocol adaptor/converter.

13. A communications system including a voice over IP terminal according to claim 11 and further comprising:
   means for receiving from said terminal a message including an indication that said terminal is adapted to wait a predetermined time before sending a message to release resources linked to a call following detection of said pressing of said hang-up key during said call and sending said resource-release message after said predetermined time if picking up by a user has not been detected during said predetermined time;
   means for obtaining said predetermined time; and
   means for sending said predetermined time to said terminal in a message;
   said means being distributed in one or more devices of an IP communications network core of said system.

14. A communications system comprising a voice over IP terminal and a device of a core of an IP communications network wherein said voice over IP terminal is adapted to send a message to said device of a core of said IP communications network, wherein said message includes a header including an indication that said terminal is adapted to:
   wait a predetermined time before sending a message to release resources linked to a call following detection of pressing of a hang-up key during said call, and
   send said resource-release message at the end of said predetermined time if picking up by a user has not been detected during said predetermined time.

15. The voice over IP network of claim 14, wherein said message further comprises another header including a value for said predetermined time.

16. A voice over IP terminal registered with an IP network core, comprising:
   detecting components configured to detect the pressing of a hang-up key of said IP terminal during a call;
   sending components configured to send a device of said IP network core a message to release resources allocated to said call;
   delaying components configured to delay said device of said IP network core from sending a message to release resources allocated to said call for a predetermined time following detection of said pressing of said hang-up key; and
   detecting components configured to detect said terminal picking up by said user;
   sending components configured to send said resource-release message to said device of the network core after the predetermined time if picking up by said user has not been detected by said detecting components for detecting picking up by said user during said predetermined time.

17. A communications system including a voice over IP terminal and further comprising:
   receiving components configured to receive from said terminal a message including an indication that said terminal is adapted to:
      wait a predetermined time before sending a message to release resources linked to a call following detection of pressing of a hang-up key of said IP terminal during said call, and
      sending said resource-release message after said predetermined time if picking up by said user has not been detected during said predetermined time;
   obtaining components configured to obtain said predetermined time; and
   sending components configured to send said predetermined time to said terminal in a message;
   wherein said components are distributed in one or more devices of an IP communications network core of said system.

* * * * *

UNITED STATES PATENT AND TRADEMARK OFFICE
CERTIFICATE OF CORRECTION

| | | |
|---|---|---|
| PATENT NO. | : 8,730,948 B2 | Page 1 of 1 |
| APPLICATION NO. | : 12/935276 | |
| DATED | : May 20, 2014 | |
| INVENTOR(S) | : Jean-Claude Le Rouzic et al. | |

It is certified that error appears in the above-identified patent and that said Letters Patent is hereby corrected as shown below:

In the specification

In column 5 at line 22, Change "35" to --3B--.

Signed and Sealed this
Twenty-ninth Day of December, 2015

Michelle K. Lee
*Director of the United States Patent and Trademark Office*